United States Patent
Zhuo

(10) Patent No.: US 10,833,846 B1
(45) Date of Patent: Nov. 10, 2020

(54) SHARED BLOCKCHAIN DATA STORAGE BASED ON ERROR CORRECTION CODING IN TRUSTED EXECUTION ENVIRONMENTS

(71) Applicant: Alibaba Group Holding Limited, George Town (KY)

(72) Inventor: Haizhen Zhuo, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/712,828

(22) Filed: Dec. 12, 2019

Related U.S. Application Data

(63) Continuation of application No. PCT/CN2019/105327, filed on Sep. 11, 2019.

(51) Int. Cl.
*H04L 9/32* (2006.01)
*H04L 9/06* (2006.01)
(Continued)

(52) U.S. Cl.
CPC .............. *H04L 9/0637* (2013.01); *G06F 9/54* (2013.01); *G06F 11/1044* (2013.01);
(Continued)

(58) Field of Classification Search
CPC ... H04L 9/0637; H04L 9/3234; H04L 63/123; G06F 21/64
See application file for complete search history.

(56) References Cited

U.S. PATENT DOCUMENTS 10,656,996 B2 * 5/2020 Chang ................. H03M 13/154
2011/0029840 A1 * 2/2011 Ozzie .................. G06F 11/1004
714/763
(Continued)

FOREIGN PATENT DOCUMENTS

CN 108769146 11/2018
CN 109359223 2/2019
(Continued)

OTHER PUBLICATIONS

Perard et al. Erasure code-based low storage blockchain node May 2, 2018 arXiv:1805.00860 (Year: 2018).*
(Continued)

*Primary Examiner* — David J Pearson
(74) *Attorney, Agent, or Firm* — Fish & Richardson P.C.

(57) ABSTRACT

Disclosed herein are methods, systems, and apparatus, including computer programs encoded on computer storage media, for processing blockchain data. One of the methods includes receiving a request from a blockchain node of the blockchain network to execute one or more software instructions in a trusted execution environment (TEE). One or more blocks infrequently accessed for executing the one or more software instructions are determined. Error correction coding of the one or more blocks in the TEE is performed to generate one or more encoded blocks. Each of the one or more encoded blocks are divided into a plurality of datasets based on the one or more software instructions. The plurality of datasets and a data storage arrangement are sent to blockchain network nodes, where the data storage arrangement indicates at least one of the plurality of datasets to be stored by each of the blockchain nodes.

27 Claims, 9 Drawing Sheets

(51) Int. Cl.
*G06F 9/54* (2006.01)
*G06F 11/10* (2006.01)
*G06F 21/64* (2013.01)
*H04L 29/06* (2006.01)

(52) U.S. Cl.
CPC ............ *G06F 21/64* (2013.01); *H04L 9/0643* (2013.01); *H04L 9/3234* (2013.01); *H04L 63/123* (2013.01); *H04L 2209/38* (2013.01)

(56) References Cited

U.S. PATENT DOCUMENTS

| | | | |
|---|---|---|---|
| 2016/0211869 A1* | 7/2016 | Blaum ................. | H03M 13/373 |
| 2017/0359374 A1 | 12/2017 | Smith et al. | |
| 2018/0139278 A1* | 5/2018 | Bathen ................ | H04L 67/1095 |
| 2018/0189333 A1* | 7/2018 | Childress ............ | G06F 16/2219 |
| 2018/0217898 A1* | 8/2018 | Tormasov ............. | G06Q 20/10 |
| 2018/0227275 A1* | 8/2018 | Russinovich ......... | H04L 9/0637 |
| 2018/0349621 A1* | 12/2018 | Schvey .................. | G06F 21/40 |
| 2020/0012805 A1* | 1/2020 | Winarski ............ | G06F 21/6227 |
| 2020/0034339 A1* | 1/2020 | Gershaneck .......... | G06F 16/162 |
| 2020/0117362 A1* | 4/2020 | McCarthy ............. | G06F 3/0652 |

FOREIGN PATENT DOCUMENTS

| | | |
|---|---|---|
| CN | 109871366 | 6/2019 |
| CN | 110032876 | 7/2019 |
| CN | 110071802 | 7/2019 |
| WO | WO 2019120327 | 6/2019 |

OTHER PUBLICATIONS

Kadhe et al. SeF: A Secure Fountain Architecture for Slashing Storage Costs in Blockchains Jun. 28, 2019 arXiv:1906.12140 (Year: 2019).*
U.S. Appl. No. 16/712,702, filed Dec. 12, 2019, Zhou.
U.S. Appl. No. 16/713,961, filed Dec. 13, 2019, Zhou.
U.S. Appl. No. 16/852,212, filed Apr. 17, 2020, Zhou.
U.S. Appl. No. 16/712,935, filed Dec. 12, 2019, Zhou.
U.S. Appl. No. 16/713,332, filed Dec. 13, 2019, Zhou.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report and Written Opinion in PCT Appln. No. PCT/CN2019/105327, dated Jun. 10, 2020, 8 pages.
Extended Search Report in European Appln No. 198108995, dated Sep. 24, 2020, 9 pages.
Dai et al, "A Low Storage Room Requirement Framework for Distributed Ledger in Biockcham," IEEE Access. Mar. 12, 2018, 5 pages.

* cited by examiner

SHARED BLOCKCHAIN DATA STORAGE BASED ON ERROR CORRECTION CODING IN TRUSTED EXECUTION ENVIRONMENTS

CROSS-REFERENCE TO RELATED APPLICATIONS

This application is a continuation of PCT Application No. PCT/CN2019/105327, filed on Sep. 11, 2019, which is hereby incorporated by reference in its entirety.

TECHNICAL FIELD

This specification relates to shared storage of blockchain data based on error correction coding in trusted execution environments.

BACKGROUND

Distributed ledger systems (DLSs), which can also be referred to as consensus networks, and/or blockchain networks, enable participating entities to securely and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Blockchain-based programs can be executed by a distributed computing platform. For example, the distributed computing platform can include a virtual machine that provides the runtime environment for executing smart contracts. A blockchain computing platform can be viewed as a transaction-based state machine. State data in the platform can be assembled to a global shared-state referred to as a world state. The world state comprises a mapping between account addresses and account states. The world state can be stored in data structures such as the Merkle Patricia tree (MPT).

Besides state data, blockchain networks can also store other types of data such as block data and index data. Block data can include block header and block body. The block header can include identity information of a particular block and the block body can include transactions that are confirmed with the block. As transactions are increasingly entered into the blockchain, state data and block data can grow very large in size. In some DLSs, every node stores an entire copy of the blockchain, which can take large amount of storage space. This is because all block data and state data are stored going back to the first transaction recorded to the blockchain. In some DLSs, a few shared nodes store the entire copy of the blockchain and share blockchain data with other blockchain nodes which can create "data inequality." That is, when data are unevenly distributed across different nodes, the risk of data security can be high when nodes that store majority of data are at fault.

Accordingly, it would be desirable to enable storage of data on nodes in the DLS in a manner that reduces consumption of technical resources, such as computational resources and memory. It is also desirable to enable such storage in a manner that maintains data equality and data processing efficiency.

SUMMARY

This specification describes technologies for storing blockchain data based on error correction coding in trusted execution environments (TEEs). These technologies generally involve receiving a request from a blockchain node of the blockchain network to execute one or more software instructions in the TEE; determining one or more blocks that are infrequently accessed for executing the one or more software instructions, wherein the one or more blocks are stored on the blockchain node and are appended to a blockchain; performing error correction coding of the one or more blocks in the TEE to generate one or more encoded blocks; dividing each of the one or more encoded blocks to a plurality of datasets based on the one or more software instructions; and sending the plurality of datasets and a data storage arrangement to blockchain nodes of the blockchain network based on the one or more software instructions, wherein the data storage arrangement indicates at least one of the plurality of datasets to be stored by each of the blockchain nodes.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
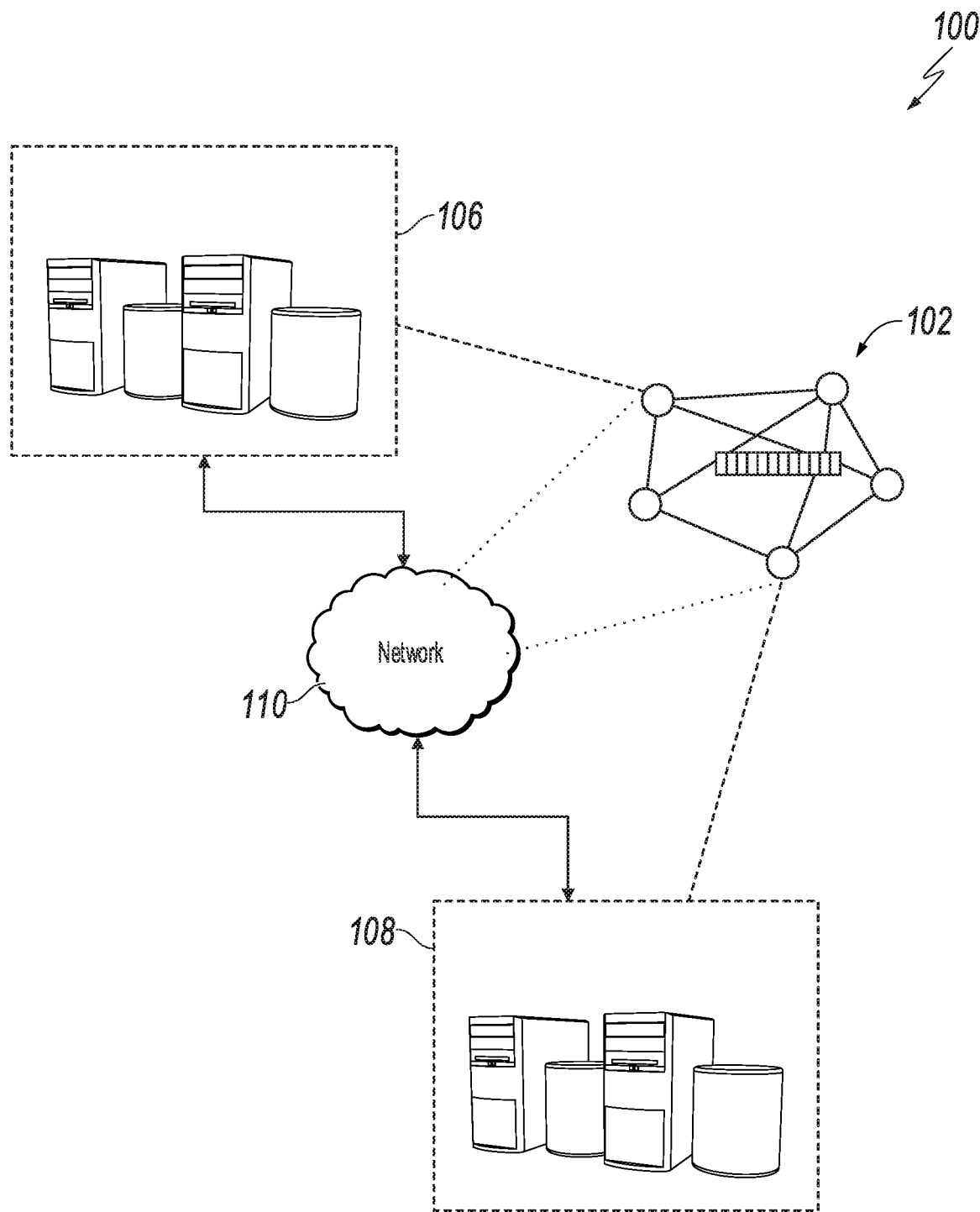
FIG. 1 depicts an example of an environment that can be used to execute embodiments of this specification.

This specification describes technologies for storing blockchain data based on error correction coding (ECC) in trusted execution environments (TEE). These technologies generally involve receiving a request from a blockchain node of the blockchain network to execute one or more software instructions in the TEE; determining one or more blocks that are infrequently accessed for executing the one or more software instructions, wherein the one or more blocks are stored on the blockchain node and are appended to a blockchain; performing error correction coding of the one or more blocks in the TEE to generate one or more encoded blocks; dividing each of the one or more encoded blocks to a plurality of datasets based on the one or more software instructions; and sending the plurality of datasets and a data storage arrangement to blockchain nodes of the blockchain network based on the one or more software instructions, wherein the data storage arrangement indicates at least one of the plurality of datasets to be stored by each of the blockchain nodes.

The techniques described in this specification produce several technical effects. For example, embodiments of the subject matter reduce the burden on storage resources of blockchain nodes, while maintaining computational efficiency and data equality of the blockchain nodes. Because some blocks are infrequently accessed (e.g., older blocks), storage resources of blockchain nodes are conserved by saving only a portion of ECC encoded block (or simply, encoded block) on each blockchain node and sharing the remainder of the data with other blockchain nodes.

In some embodiments, a blockchain node can store a selected subset of the ECC encoded blocks and hash values corresponding to other subsets of the encoded blocks. To retrieve unsaved subsets of the encoded blocks from other blockchain nodes, the blockchain node can send corresponding hash values to the other blockchain nodes. Since hash values are irreversible, the blockchain node can verify whether the received data are authentic, by hashing the received data and comparing the hashed values with hash values that are locally stored. As such, data security can be ensured and faulty nodes can be identified. Even if the blockchain node receives unauthentic data from faulty blockchain nodes, the corresponding block can be recovered as long as the percentage of the unauthentic data is less than or equal to the maximum fraction of erroneous bits allowed by the ECC.

In some embodiments, instead of performing ECC on each blockchain node, the ECC can be performed in a TEE associated with a trusted node. By using TEE technology, the trusted node can generate verifiable encoded blocks, divide the encoded blocks to datasets, and send the datasets and a data storage arrangement to each blockchain node for storage. The datasets generated under TEE can be verifiable by the blockchain nodes to ensure data authenticity. Each blockchain node can then store a portion of the datasets based on the data storage arrangement to save on storage space. By having a TEE enabled trusted node, the ECC needs to be performed only once, instead of separately performed by each blockchain node. As such, the overall computing resource consumption of the blockchain network can be significantly reduced.

In some embodiments, each of the blockchain nodes can have a TEE to perform the ECC. Each blockchain node can separately request a corresponding TEE to perform ECC when computational resource consumption is low or usage rate of storage is high. The blockchain nodes can also synchronize with each other and request encoded blocks from TEEs associated with other blockchain nodes. As such, the usage of computational and storage resources of the blockchain network can be further optimized.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some examples, the computing systems 106, 108 can be nodes of a cloud computing system (not shown), or each computing system 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
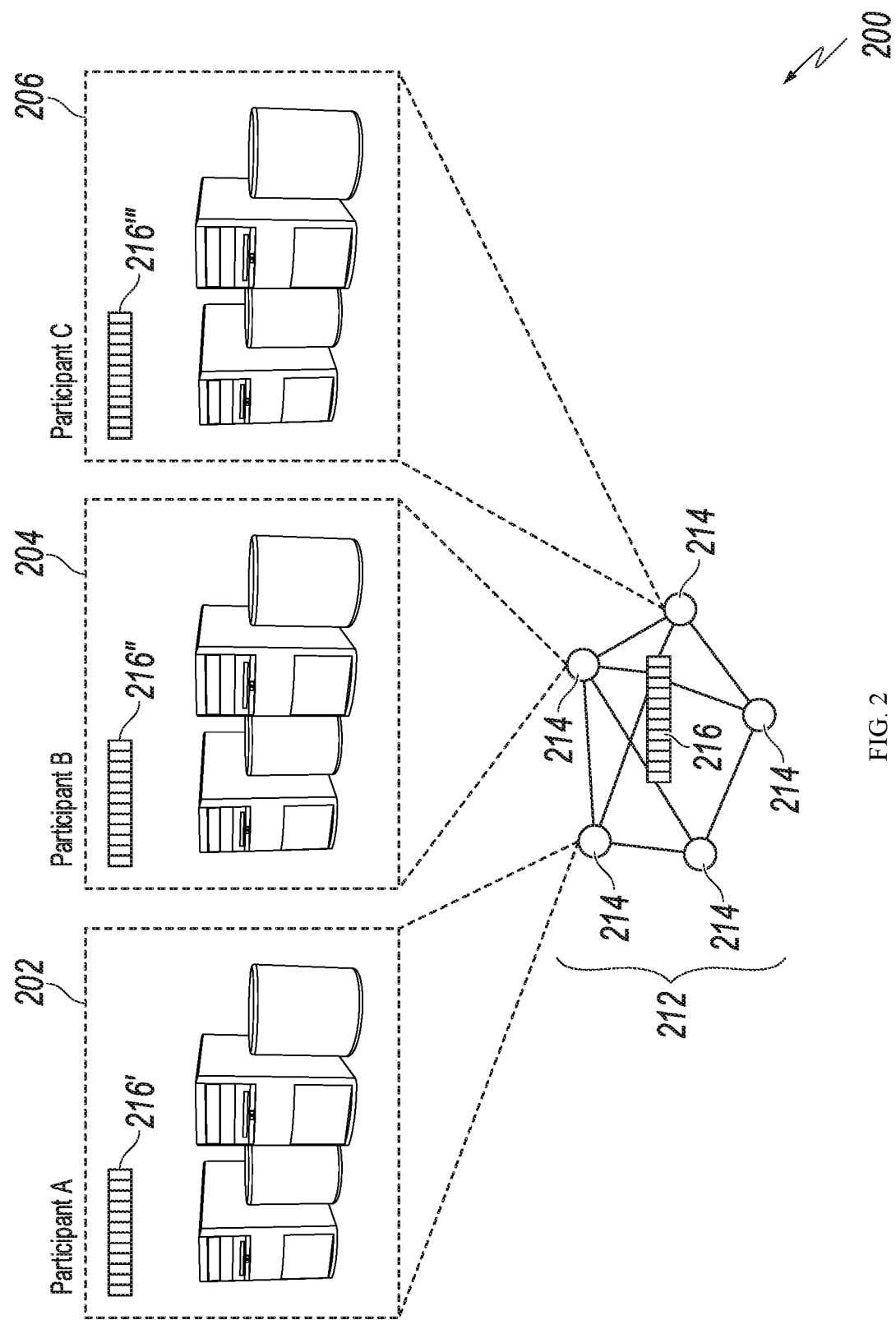
FIG. 2 depicts an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216'', and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, nodes of the blockchain network, and/or nodes that communicate with the blockchain network can operate using trusted execution environments (TEEs). At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that embodiments of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied. The trusted portion provides an encrypted response to the call, and the TA continues to execute.

An attestation process can be performed to verify that expected code (e.g., the trusted portion of the TA) is securely executing within the SGX-provided TEE. In general, the attestation process includes a TA receiving an attestation request from a challenger (e.g., another node in the blockchain network, a key management system (KMS) of the blockchain network). In response, the TA requests that its enclave produce a remote-attestation, also referred to as a quote. Producing the remote-attestation includes a local-attestation being sent from the enclave to a so-called quoting enclave, which verifies the local-attestation, and converts the local-attestation into the remote-attestation by signing the local-attestation using an asymmetric attestation key. The remote-attestation (quote) is provided to the challenger (e.g., KMS of the blockchain network).

The challenger uses an attestation verification service to verify the remote-attestation. For SGX, Intel provides the Intel Attestation Service (IAS), which receives the remote-attestation from the challenger, and verifies the remote-attestation. More particularly, the IAS processes the remote-attestation, and provides a report (e.g., attestation verification report (AVR)), which indicates whether the remote-attestation is verified. If not verified, an error can be indicated. If verified (the expected code is securely executing in the TEE), the challenger can start, or continue interactions with the TA. For example, in response to the verification, the KMS (as challenger) can issue asymmetric encryption keys (e.g., a public-key and private-key pair) to the node executing the TEE (e.g., through a key exchange process, such as elliptical curve Diffie-Hellman (ECDH)) to enable the node to securely communicate with other nodes, and/or clients.

As described herein, blockchain networks can store different types of data such as state data, block data, and index data. Block data includes all transactions in the blockchain network, which can take a large amount of storage space as new blocks are constantly adding to the blockchain. It can be inefficient for the blockchain nodes to each store an entire copy of the block data, especially for data of infrequently accessed blocks (e.g., blocks added to the blockchain long time ago). Accordingly, embodiments of this specification provide that each blockchain node stores a portion of infrequently accessed blocks and retrieves the remainder of the block data from other nodes when needed, to reduce storage consumption. However, if faulty nodes or unreliable nodes exist in the blockchain network, the retrieved data cannot be trusted and data loss may occur.

In some embodiments, the blockchain nodes can perform ECC such as erasure coding to encode the infrequently accessed blocks. By sharing ECC encoded blocks, even if unauthentic data exists or data loss occurs, the original block data can be recovered as long as the unauthentic data or data loss is less than or equal to the maximum fraction of erroneous bits or of missing bits that can be corrected by the ECC.

In some embodiments, instead of performing ECC on each blockchain node, the ECC can be performed under a TEE associated with a trusted node. By using the TEE technology, the trusted node can generate verifiable encoded blocks, divide the encoded blocks to datasets, and send the datasets and a data storage arrangement to each blockchain node for storage. The datasets generated under TEE can be verifiable by the blockchain nodes. Each blockchain node can then store a portion of the datasets based on the data storage arrangement to save on storage space. By having a TEE enabled trusted node, the ECC only needs to be performed once, instead of separately performed by each blockchain node. As such, the overall computing resource consumption of the blockchain network can be significantly reduced.

In some embodiments, each of the blockchain nodes can have a TEE to perform the ECC. Each blockchain node can separately request a corresponding TEE to perform ECC when computational resource consumption is low or usage rate of storage is high. The blockchain nodes can also synchronize with each other and request encoded blocks from TEEs associated with other blockchain nodes. As such, the usage of computational and storage resources of the blockchain network can be further optimized.

Figure 3:
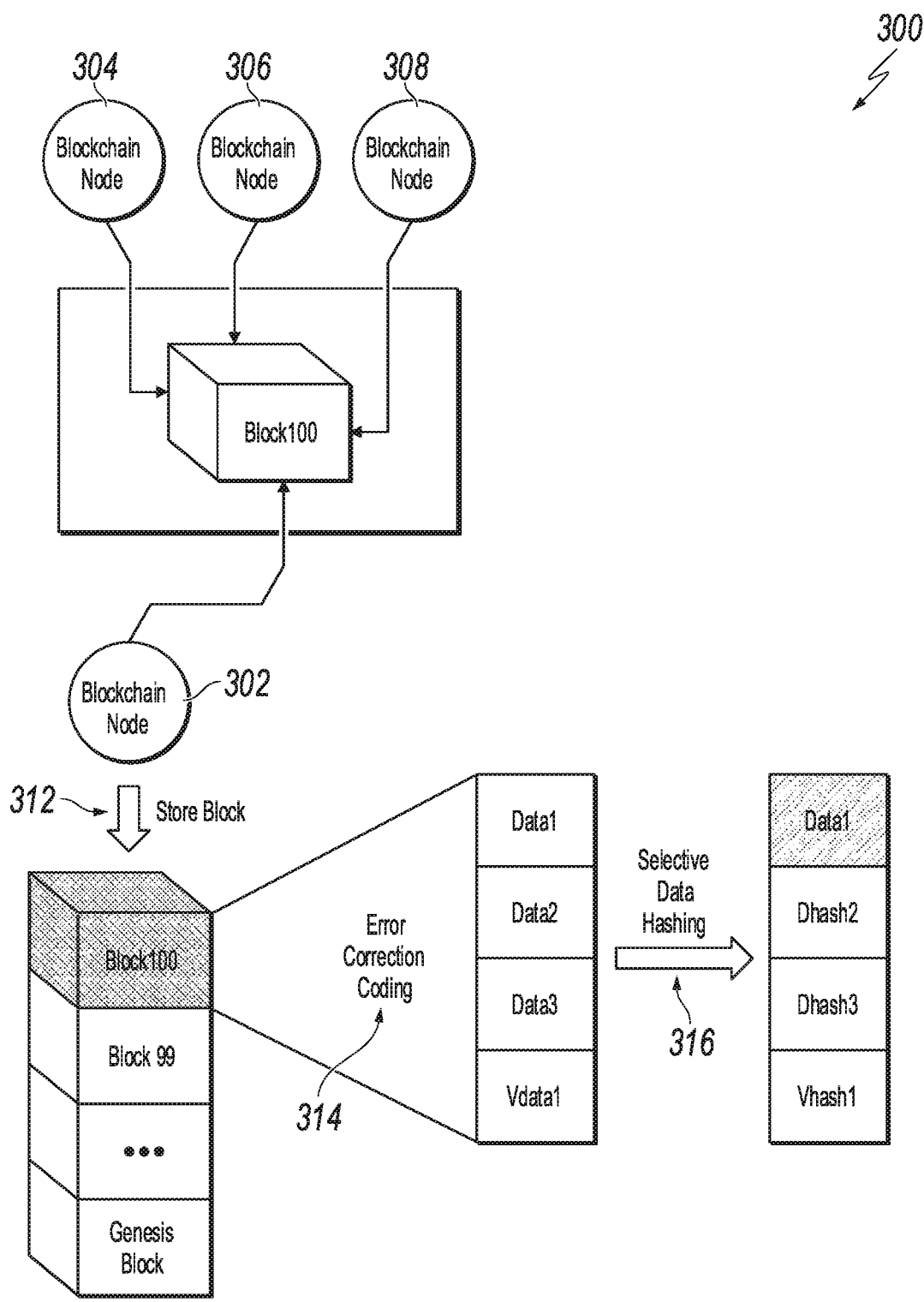
FIG. 3 depicts an example of a block data encoding and hashing process in accordance with embodiments of this specification.

FIG. 3 depicts an example of a block data encoding and hashing process 300 in accordance with embodiments of this specification. In this example, a blockchain network of four blockchain nodes is depicted, which are blockchain nodes 302, 304, 306, and 308. Using blockchain node 302 as an example to illustrate the encoding and hashing process 300, the blockchain node 302 can store block data of the blockchain network to block body of a block 312. In the illustrated example, after block data are stored in a block (i.e., block 100), the blockchain node 302 can engage in a consensus process with other blockchain nodes 302, 304, 306, and 308. During the consensus process, the blockchain node 302 can perform a consensus algorithm, such as proof of work (PoW) or proof of stake (PoS) to create a corresponding block on the blockchain.

In some embodiments, the blockchain node 302 can identify one or more infrequently accessed blocks. In practice, the longer a block has been created, the less likely the corresponding block data is needed for operations such as executing smart contracts. The blockchain node 302 can determine that locally stored blocks are infrequently accessed blocks when they have been appended to the blockchain for a predetermined amount of time. For example, the predetermined amount of time can be one or two times of the average time a block is created. In some examples, a block can also be determined as infrequently accessed when no block data in the block is retrieved for the predetermined amount of time to execute smart contracts.

After identifying infrequently accessed blocks, the blockchain node 302 can perform ECC 314 of block data in the block body of each of the infrequently accessed blocks. ECC can be used for controlling errors or losses of data over unreliable transmissions by adding redundant bits to the data. The redundancy can allow errors or losses of data to be corrected without retransmission of the data. One example ECC can be the erasure coding. Using the erasure coding, a message of k symbols can be encoded to a codeword with n symbols, where k and n are natural numbers, and k<n. The message can be recovered from a subset of the n-symbol codeword. The fraction r=k/n is the code rate of the erasure code.

By using ECC, each of the blockchain nodes can store a portion of the encoded block data and retrieve the remainder of the encoded block data from other blockchain nodes when needed. In some embodiments, the ECC can be performed when utilization rate of computational resource of the blockchain node 302 is lower than a predetermined value (e.g., 40%). As such, the interference with other computational operations on the blockchain node 302 can be reduced. In some embodiments, ECC can be performed when the usage of storage space of the blockchain node 302 is greater than or equal to a predetermined percentage, such that after ECC, some portions of the encoded block data can be deleted to free up storage space.

Again using block 100 as an example, and assuming that the blockchain node 302 determines the block 100 as an infrequently accessed block and performs ECC 314, the ECC encoded data can be divided into a plurality of datasets based on a data storage arrangement. Generally, the data storage arrangement can include one or more predetermined rules for dividing the encoded data to a plurality of datasets based on the number of blockchain nodes in a blockchain network. The data storage arrangement can also include assignments of one or more datasets of the plurality of datasets to be stored or hashed by each of the blockchain nodes. To ensure data equality, the data storage arrangement can include an assignment of at least one dataset to be stored by each blockchain node of the blockchain network.

In the example shown in FIG. 3, the encoded block data of block 100 is divided into four datasets, which are Data1, Data2, Data3, and Vdata1, each to be kept by one of the blockchain nodes 302, 304, 306, and 308. Vdata1 can represent the redundant bits of the ECC for error correction. Data1 is selected to be stored by the blockchain node 302 according to the data storage arrangement. Data2, Data3, and Vdata1 are selected to be separately hashed 316 to generate hash values Dhash2, Dhash3, and Vhash1, respectively. In accordance with embodiments of this specification, the encoded data can be divided to more than four datasets when the blockchain network has more than four nodes. In some examples, each of the blockchain nodes can store more than one dataset and hash the remainder of the datasets assigned to be stored by other nodes.

Figure 4:
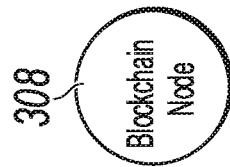
FIG. 4 depicts an example of a data storage arrangement in accordance with embodiments of this specification.
Figure 4:
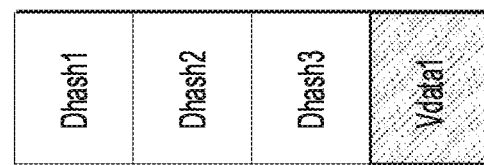
Figure 4:
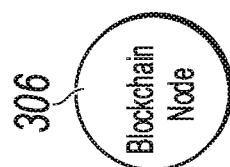
Figure 4:
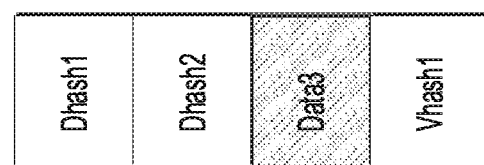
Figure 4:
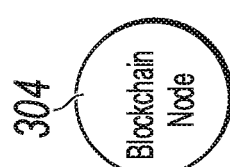
Figure 4:
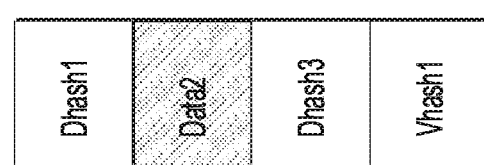
Figure 4:
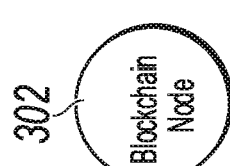
Figure 4:
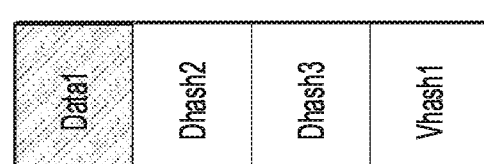

Referring now to FIG. 4, FIG. 4 depicts an example of a data storage arrangement 400 in accordance with embodiments of this specification. As discussed earlier, Data1 is selected to be stored by the blockchain node 302 according to the data storage arrangement 400. Based on the data storage arrangement 400, blockchain node 304 stores Data2 and separately hashes Data1, Data3, and Vdata1 to generate hash values Dhash1, Dhash3, and Vhash1, respectively. Blockchain node 306 stores Data3 and separately hashes Data1, Data2, and Vdata1 to generate hash values Dhash1, Dhash2 and Vhash1, respectively. Blockchain node 308 stores Vdata1 and separately hashes Data1, Data2, and Vdata3 to generate hash values Dhash1, Dhash2 and Dhash3, respectively.

Referring back to FIG. 3, because the hash values correspond to encoded datasets of the same block, they can be indexed by a block ID of the block. For example, the blockchain node 302 can index Data1, Dhash1, Dhash2, and Vhash1 associated with block 100 with a block ID 100. As such, the blockchain node 302 can use the indexed block ID to map the hash values to their corresponding blocks.

It is to be understood that other data storage arrangements can be made for the blockchain nodes 302, 304, 306, and 308, according to the data storage arrangement. In some examples, the encoded block data of block 100 can be divided to more than four datasets. It is to be understood that other data storage arrangements can be made for the blockchain nodes 502, 504, 506, and 508, according to the data storage arrangement.

After generating and storing Dhash2, Dhash3, and Vhash1, the blockchain node 302 can delete Data2, Data3, and Vdata1 from storage to save storage space. As such, for each block, the blockchain node 302 only stores one ECC encoded dataset (i.e., Data1) and three hash values (i.e., Dhash2, Dhash3, and Vhash1), instead of the entire block. As such, storage space can be significantly reduced. Similar to block 100, the encoding and hashing process can be performed for other infrequently accessed blocks that are stored by the blockchain nodes 304, 306, and 308.

When the blockchain node 302 determines that block data of the block 100 is needed for executing a smart contract, it can retrieve Data2, Data3, and Vdata1 from blockchain nodes 304, 306, and 308, respectively, according to the data storage arrangement. To retrieve datasets from other blockchain nodes 304, 306, and 308, blockchain node 302 can send hash values corresponding to the datasets to be retrieved according to the data storage arrangement.

For example, to retrieve Data2, the blockchain node 302 can send Dhash2 to the blockchain node 304. If the blockchain node 304 has Data2 stored, it can send the Data2 back to the blockchain node 302 in response to receiving the Dhash2. After receiving the Data2 from the blockchain node 304, the blockchain node 302 can hash the received dataset and compare the hash value with Dhash2. If the hash value is the same as Dhash2, the blockchain node 302 can determine that the received dataset is authentic. Otherwise, the received dataset is determined to be unauthentic. The blockchain node 302 can report the blockchain node 304 as a faulty node (or a Byzantine node) when the received dataset is determined as unauthentic. If the percentage of unauthentic data received by the blockchain node 302 is less than or equal to the maximum fraction of erroneous bits or of missing bits that can be corrected by the ECC, block 100 can be recovered from the locally stored and received datasets.

Figure 5:
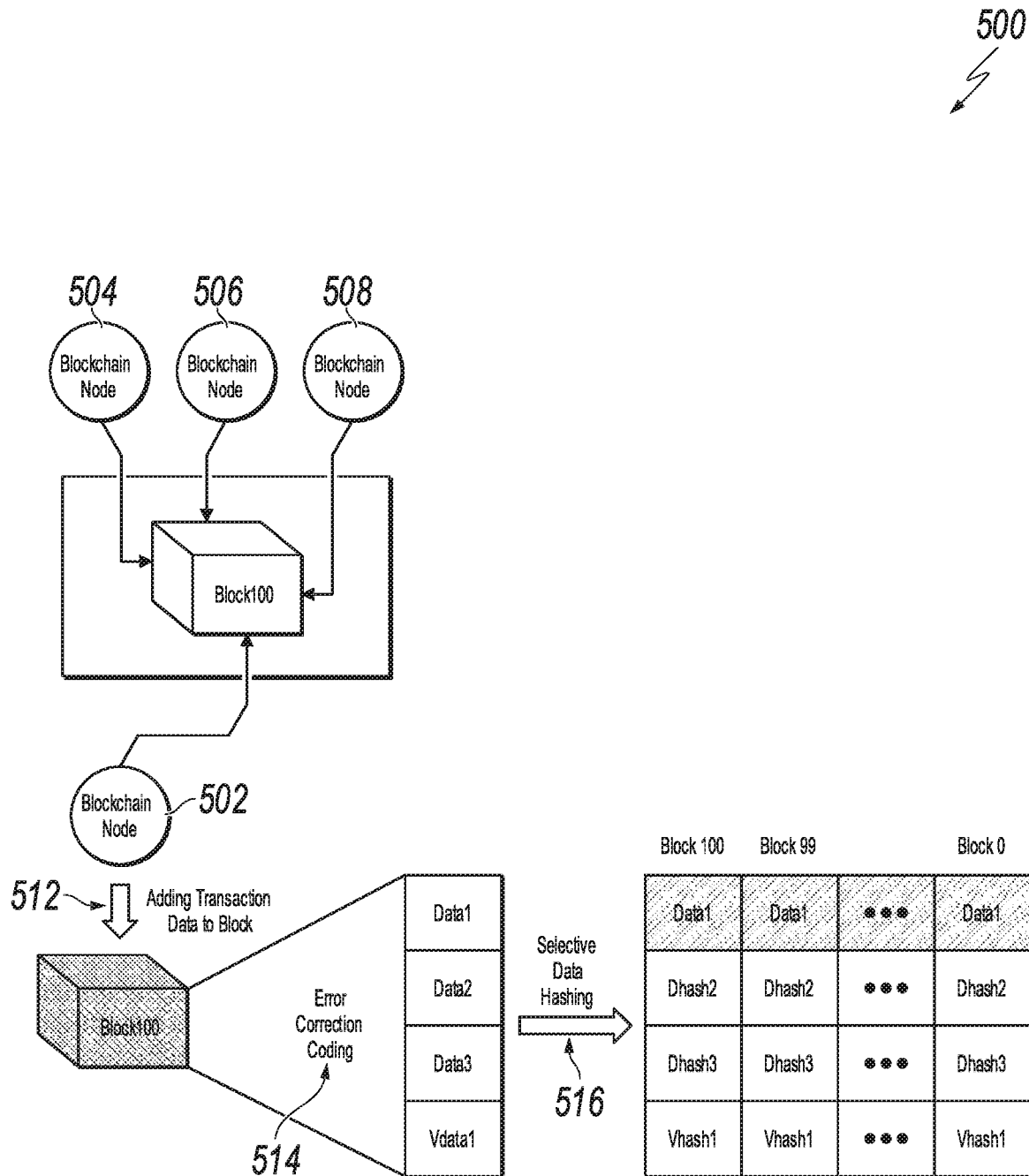
FIG. 5 depicts another example of a block data encoding and hashing process in accordance with embodiments of this specification.

FIG. 5 depicts another example of a block data encoding and hashing process 500 in accordance with embodiments of this specification. In this example, a blockchain network of four blockchain nodes is depicted, which are blockchain nodes 502, 504, 506, and 508. Using blockchain node 502 as an example to illustrate the encoding and hashing process 500, when new block data are added to the block 512, the blockchain node 502 can perform ECC 514 to encode the block data. As compared to the encoding and hashing process 300 discussed in the description of FIG. 3, the blockchain node 502 performs ECC on the block data as they are written to a block. As such, the blockchain node 502 does not need to store the entire block, but can instead, store a selected portion of the ECC encoded block data and hash values corresponding to the remainder of the encoded block data based on the data storage arrangement. This encoding and hashing process 500 can be especially suitable for scenarios when blockchain node 502 has low disk space.

In some embodiments, instead of storing data as blocks, the blockchain node 502 can store a write-ahead log (WAL) file or other similar roll-forward journal files. The WAL file can record block data that have been committed but not yet stored by the blockchain node 502. Using the WAL file, the original blockchain data can be preserved in the database file, while changes of the blockchain data can be written into a separate WAL file. A commit to roll-forward with the changes can happen without ever writing to the original blockchain data. This arrangement allows continued operations of the blockchain data while changes are committed into the WAL file. By using the WAL file to store changes made through the encoding and hashing process 500, the blockchain node 502 can indicate that it has the block data for consensus, while performing the ECC in the background when appropriate. As such, the ECC can be performed when utilization rate of computational resource of the blockchain node 302 is low, in order to reduce the impact on computational efficiency or latency of the consensus process.

In some embodiments, the blockchain node 502 can store the block data in a buffer. The blockchain node 502 can perform ECC to the block data stored in the buffer when the size of the data is greater than a predetermined threshold or when the buffer is full. After performing ECC, the blockchain node 502 can follow the encoding and hashing process 500 to store encoded block data and hash values, as discussed in the description below.

Using again block 100 as an example, after performing the ECC, the encoded block data can be divided into a plurality of datasets based on the data storage arrangement. Similar to the example discussed in the description of FIG. 3, the encoded block data of block 100 can be divided into four datasets, which are Data1, Data2, Data3, and Vdata1, each to be kept by one of the blockchain nodes 502, 504, 506, and 508. Vdata1 can represent the redundant bits of the ECC. Data1 is selected to be stored by the blockchain node 502 according to the data storage arrangement. Data2, Data3, and Vdata1 are selected to be separately hashed 516 to generate hash values Dhash2, Dhash3, and Vhash1, respectively. The hash values can be indexed by a block ID of a corresponding block of the hash values. For example, the blockchain node 502 can index Data1, Dhash1, Dhash2, and Vhash1 associated with block 100 with a block ID 100. As such, the blockchain node 502 can use the indexed block ID to map the hash values to their corresponding blocks.

It is to be understood that other data storage arrangements can be made for the one or more blockchain nodes 502, 504, 506, and 508, according to the data storage arrangement. For example, the encoded block data of block 100 can be divided into more than four datasets. Each of the blockchain nodes 502, 504, 506, and 508 can store more than one dataset and hash the remainder of the datasets stored by other nodes.

After generating Dhash2, Dhash3, and Vhash1, the blockchain node 502 can store Data1, Dhash2, Dhash3, and Vhash1 and delete Data2, Data3, and Vdata1 from storage to save storage space. As such, for each block of the blockchain, the blockchain node 502 only stores one dataset (i.e., Data1) and three hash values (i.e., Dhash2, Dhash3, and Vhash1) of the ECC encoded block data instead of the original block data to save on storage space. When the blockchain node 502 determines that block data of the block 100 is needed for executing a smart contract, it can retrieve Data2, Data3, and Vdata1 from blockchain nodes 504, 506, and 508, respectively, according to the data storage arrangement.

To retrieve datasets from other blockchain nodes 504, 506, and 508, blockchain node 502 can send hash values corresponding to the datasets to be retrieved according to the data storage arrangement. For example, to retrieve Data2, the blockchain node 502 can send Dhash2 to the blockchain node 504. If the blockchain node 504 has Data2 stored, it can send the Data2 back to the blockchain node 502 in response to receiving the Dhash2. After receiving the Data2 from the blockchain node 504, the blockchain node 502 can hash the received dataset and compare the hash value with Dhash2. If the hash value is the same as Dhash2, the blockchain node 502 can determine that the received dataset is authentic. Otherwise, the received dataset can be determined as unauthentic. The blockchain node 502 can report the blockchain node 504 as a faulty node (or a Byzantine node) when the received dataset is determined as unauthentic. If the percentage of unauthentic data received by the blockchain node 502 is less than or equal to the maximum fraction of erroneous bits or of missing bits that can be corrected by the ECC, block 100 can be recovered from the locally stored and received datasets.

Figure 6:
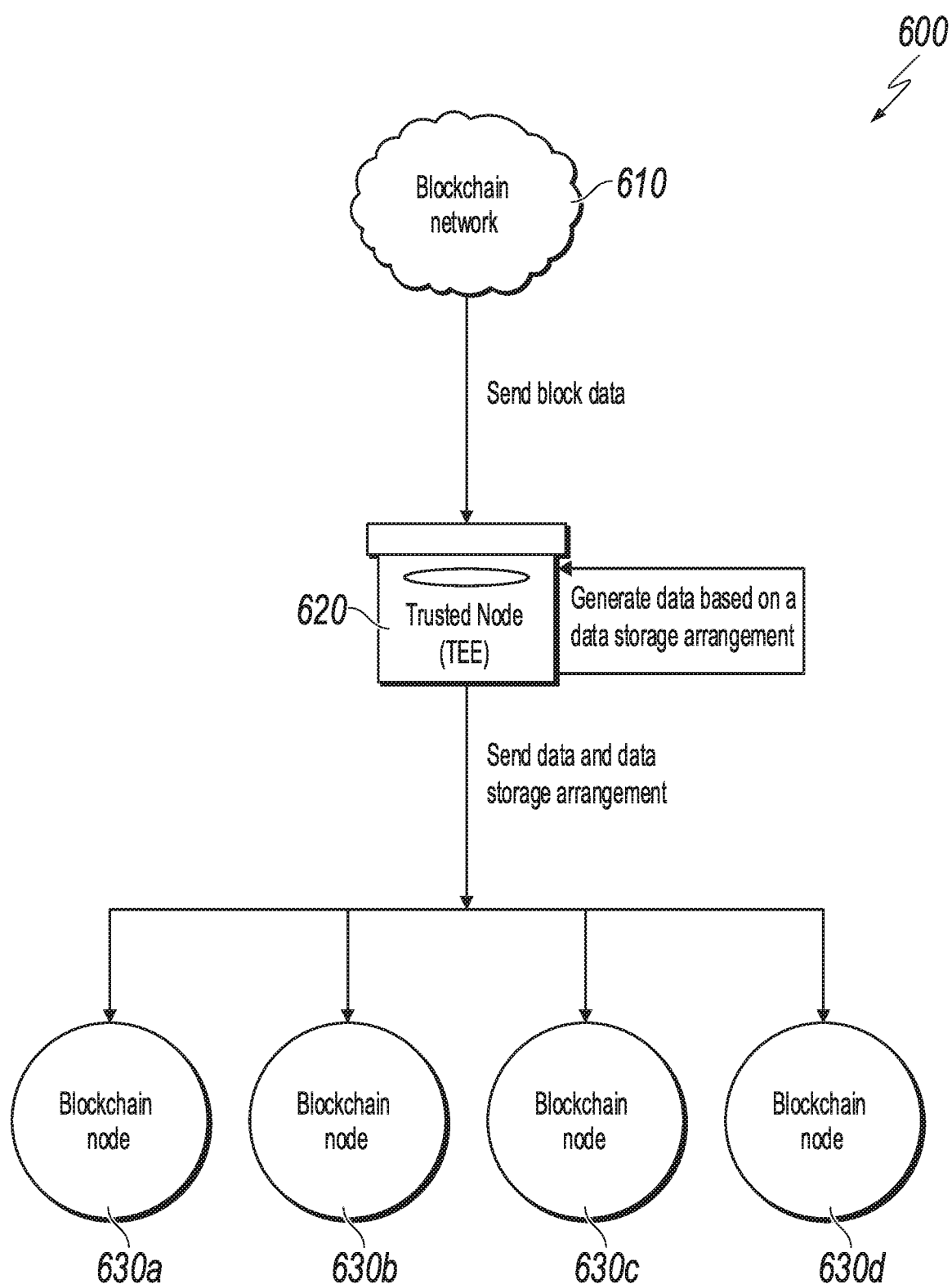
FIG. 6 depicts an example of a process of shared blockchain data storage based on a trusted execution environment (TEE).

FIG. 6 depicts an example of a process 600 of shared blockchain data storage based on TEE. In this example, it is assumed that a blockchain network 610 includes four blockchain nodes, which are blockchain nodes 630*a-d*. The blockchain network 610 also includes, or is in communication with a trusted node 620 hosting a TEE. The trusted node 620 can be a computing device, a computing system, or a cloud computing system. As discussed earlier, the TEE can be hosted by one or more data processors of the trusted node 620 isolated from the one or more data processors' operating system and is configured to provide enhanced confidentiality and integrity of code executing and data loading within the one or more data processors.

In some embodiments, the trusted node 620 can be a node with proof of authority (POA). In some examples, the POA can be provided based on the status of the trusted node 620. For example, the trusted node 620 can be a node administered by a deployer of the blockchain network 610. In such cases, the trusted node 620 can be part of the blockchain network 610 or outside of the blockchain network 610. In some examples, the POA can be gained through voting. For example, assume that the blockchain network includes 3f+1 nodes (f=1 in the example as depicted in FIG. 6, when the trusted node 620 participates in consensus of the blockchain network 620), the maximum faulty consensus nodes or Byzantine nodes (nodes that fail to act or act maliciously) that can be tolerated is f. As such, if 2f+1 nodes cast votes (endorsed by their respective digital signatures) to elect the trusted node 620, the votes 2f+1 can be used as POA for trusting the trusted node 620.

As discussed earlier, a TA, such as an SGX enabled application, can include a trusted component (or enclave component) and an untrusted component (application component). The application component is located outside of the TEE and can access the TEE's TCB through enclave interface functions. In some embodiments, these enclave interface functions are an application programming interface (API) used by the application component. The application component can use the API to make "ecalls" to invoke a virtual machine in the TEE to execute smart contracts. The virtual machine can be a software program that executes program instructions encoded in a particular programming language or in a binary format such as a bitstream. In some examples, the virtual machine may provide an abstraction layer between the program instructions and the underlying hardware of the computing device executing the virtual machine. Such a configuration can allow for the same program instructions to be executed in the same way across different computing devices having different hardware.

In some embodiments, an ecall can be made by an application component to execute a smart contract for executing one or more software instructions according to the encoding and hashing processes 300 and 500 as discussed in the description of FIGS. 3 and 5. The TEE can then perform data processing during multiple events that occur throughout the multiple steps of the processes 300, 500. The verified record of the data derived from events associated with the multiple steps of the processes 300, 500 is more reliable than a record based on only the end result of the processes 300, 500. In other words, by using the TEE technology, for each piece of data that needs to be verified, not only is the piece of data itself verified, the processes that comprise multiple steps of generating the piece of data is also verified. This ensures that the final piece of data is highly reliable because the probability that every step of the process has been fraudulently modified is low. As such, the encoding and hashing processes 300, 500, if performed under the TEE 620, can be performed just once. The computational results are verifiable based on the steps of the processes 300, 500 and can be trusted and used by the blockchain nodes 630a-d. In comparison, without TEE, each blockchain node needs to individually perform the encoding and hashing process 300 or 500, which can significantly increase the computing resource consumption of the overall blockchain network.

In some embodiments, one or more blockchain nodes 603a-d can send blockchain data to the trusted node 620. The blockchain data can include infrequently accessed blocks as discussed in the description of FIG. 3. The trusted node 620 can invoke the enclave component of the TEE to execute one or more software instructions based on a data storage arrangement. For example, the data storage arrangement can be the arrangement 400 discussed in the description of FIG. 4. After encoding each of the infrequently accessed blocks to generate ECC encoded blocks. Each ECC encoded block can be divided into four datasets based on the data storage arrangement. The datasets can be expressed as Data1, Data2, Data3, and Vdata1, each to be kept by one of the blockchain nodes 630a-d. Vdata1 can represent the redundant bits of the ECC for error correction. In some embodiments, the trusted node 620 can also calculate, under TEE, hash values of Data1, Data2, Data3, and Vdata1 expressed as Dhash1, Dhash2, Dhash3, and Vhash1, respectively.

In some embodiments, the datasets and the hash values can be indexed by their corresponding block IDs. For example, the blockchain node 630a can index Data1, Dhash1, Dhash2, and Vhash1 associated with block 100 with a block ID 100. As such, the blockchain nodes 630a-d can use the indexed block ID to map the hash values to their corresponding blocks for data recovery.

After dividing each of the encoded blocks to datasets Data1, Data2, Data3, and Vdata1, the trusted node 620 can send the datasets and the data storage arrangement to each of the blockchain nodes 630a-d. After receiving the datasets, each blockchain node can store one or more of the datasets and hash the remainder of the datasets based on the data storage arrangement. For example, blockchain node 630a can store Data1 and hash Data2, Data3, and Vdata1 to generate Dhash2, Dhash3, and Vhash1. After Data1, Dhash2, Dhash3, and Vhash1 are stored, the corresponding block can be deleted to save on storage space.

In some embodiments, the trusted node 620 can generate a checksum derived based on the blockchain data. The checksum can also be sent to the blockchain nodes 630a-d for error detection to ensure data integrity. When the blockchain node 630a determines that blockchain data of the block 100 is needed for executing a smart contract, it can retrieve Data2, Data3, and Vdata1 from the trusted node, or send corresponding hash values to retrieve from blockchain nodes 630b, 630c, and 630d. After retrieved datasets can be combined with Data1 to recover the corresponding block.

As described herein, by loading data to a TEE executing on a trusted node for processing, the data loaded inside the TEE can be protected with respect to confidentiality and integrity. The trusted node can be trusted to generate verifiable encoded blocks, divide the encoded blocks to datasets, and send the datasets and a data storage arrangement to each blockchain node for storage. Each blockchain node can then store a portion of the datasets based on the data storage arrangement to save on storage space. By having a TEE enabled trusted node, the ECC needs to be performed only once, instead of separately performed by each blockchain node. As such, the overall computing resource consumption of the blockchain network can be significantly reduced.

Figure 7:
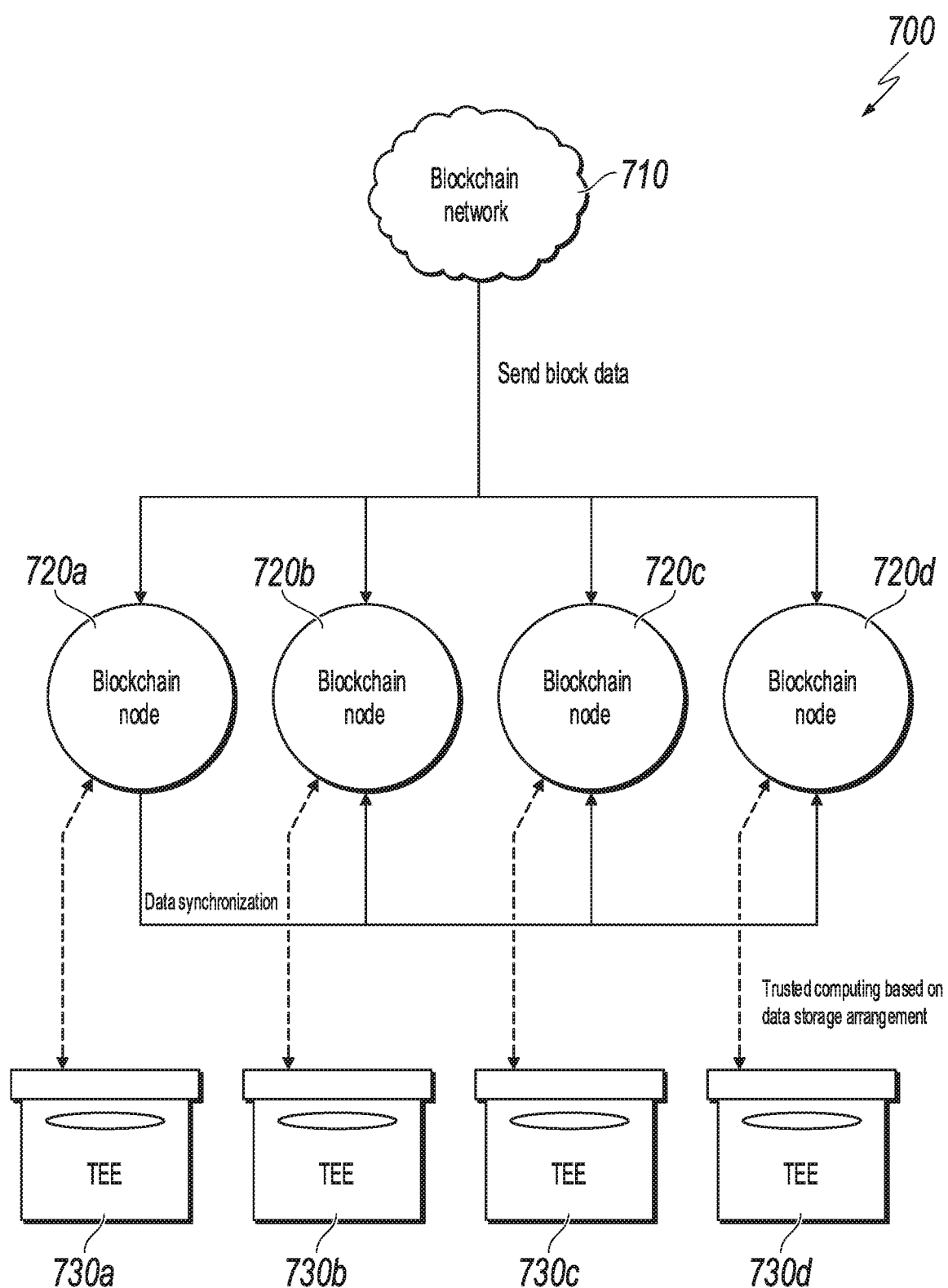
FIG. 7 depicts another example of a process of shared blockchain data storage based on a TEE.

FIG. 7 depicts another example of a process 700 of shared blockchain data storage based on TEE. In this example, it is assumed that a blockchain network 710 includes four blockchain nodes, which are blockchain nodes 720a-d. Each of the blockchain nodes 720a-d include, or is communicably coupled to a TEE. In some examples, the TEEs 730a-d can each be hosted by one or more data processors isolated from the one or more data processors' operating system of the blockchain nodes 720a-d. In some examples, the TEEs 730a-d can be hosted by processors of one or more trusted nodes communicably coupled to the blockchain nodes 720a-d.

Because each of the blockchain nodes 720a-d has ability to use TEE for trusted computing, ECC of data blocks can be separately encoded according to instructions from an enclave component of a TEE of each blockchain node. The separately encoded blocks under TEE can be trusted by other nodes of the blockchain network 700. In some embodiments, the ECC can be performed to one or more infrequently accessed blocks when they are identified, or when the blockchain node has low computational resource usage or high storage usage. In some embodiments, the number of blocks to be ECC encoded under TEE can be dynamically adjusted for each of the blockchain nodes 720a-d based on its data storage or computational resource usage condition. Accordingly, the number of ECC encoded blocks available to each of the blockchain nodes 720a-d can be different.

For example, assume that blockchain node 720a invokes an enclave component of TEE 730a to perform ECC to infrequently accessed blocks 91-100. After encoding each of the infrequently accessed blocks to generate ECC encoded blocks. Each ECC encoded block can be divided into four datasets based on the data storage arrangement. For example, the data storage arrangement can be the arrangement 400 discussed in the description of FIG. 4. The datasets can be expressed as Data1, Data2, Data3, and Vdata1, each to be kept by one of the blockchain nodes 630a-d. Vdata1 can represent the redundant bits of the ECC for error correction. In some embodiments, the TEE can also execute one or more software instructions to calculate, under TEE 730a, hash values of Data1, Data2, Data3, and Vdata1 expressed as Dhash1, Dhash2, Dhash3, and Vhash1, respectively.

In some embodiments, the datasets and the hash values can be indexed by their corresponding block IDs. For example, the blockchain node 720a can index Data1, Dhash1, Dhash2, and Vhash1 associated with block 100 with a block ID 100. As such, the blockchain nodes 720a-d can use the indexed block ID to map the hash values to their corresponding blocks for data recovery.

After dividing each of the encoded blocks to datasets Data1, Data2, Data3, and Vdata1, the trusted node 620 can send the datasets and the data storage arrangement to each of the blockchain nodes 630a-d. After receiving the datasets, each blockchain node can store one or more of the datasets and hash the remainder of the datasets based on the data storage arrangement. For example, blockchain node 630a can store Data1 and hash Data2, Data3, and Vdata1 to generate Dhash2, Dhash3, and Vhash1. After Data1, Dhash2, Dhash3, and Vhash1 are stored, the corresponding block can be deleted to save on storage space.

Because blocks 91-100 are reliably encoded under TEE 730a, they can be verified and trusted by other blockchain nodes 720b-d. For example, if blockchain node 720b performs ECC to blocks 91-95, it can directly request the ECC encoded blocks 96-100 from TEE 730a and the data storage arrangement, instead of having to separately perform ECC to blocks 96-100. After receiving the ECC encoded blocks 96-100 from TEE 730a, blockchain node 720 can divide each of the encoded blocks to Data1, Data2, Data3, and Vdata1, store Data2, and hash other datasets based on the data storage arrangement. By synchronizing data encoded under TEE, the blockchain nodes 720a-d do not need to repeat the same ECC encoding process if already performed by a TEE. Therefore, when each of the blockchain nodes has a dedicated TEE, each blockchain node can separately load data to the corresponding TEE for processing to ensure data confidentiality and integrity. Moreover, the blockchain node can request a corresponding TEE to perform ECC when computational resource consumption is low or usage rate of storage is high. The blockchain node can also synchronize with other blockchain nodes in the blockchain network and request encoded blocks from TEEs associated with the other blockchain nodes. As such, the usage of computational and storage resources of the blockchain network can be further optimized.

In some embodiments, the blockchain nodes 720a-d can also generate checksums derived based on the blockchain data as discussed in the description of FIG. 6. The checksums can also be synchronized among the blockchain nodes 720a-d for error detection to ensure data integrity.

Figure 8:
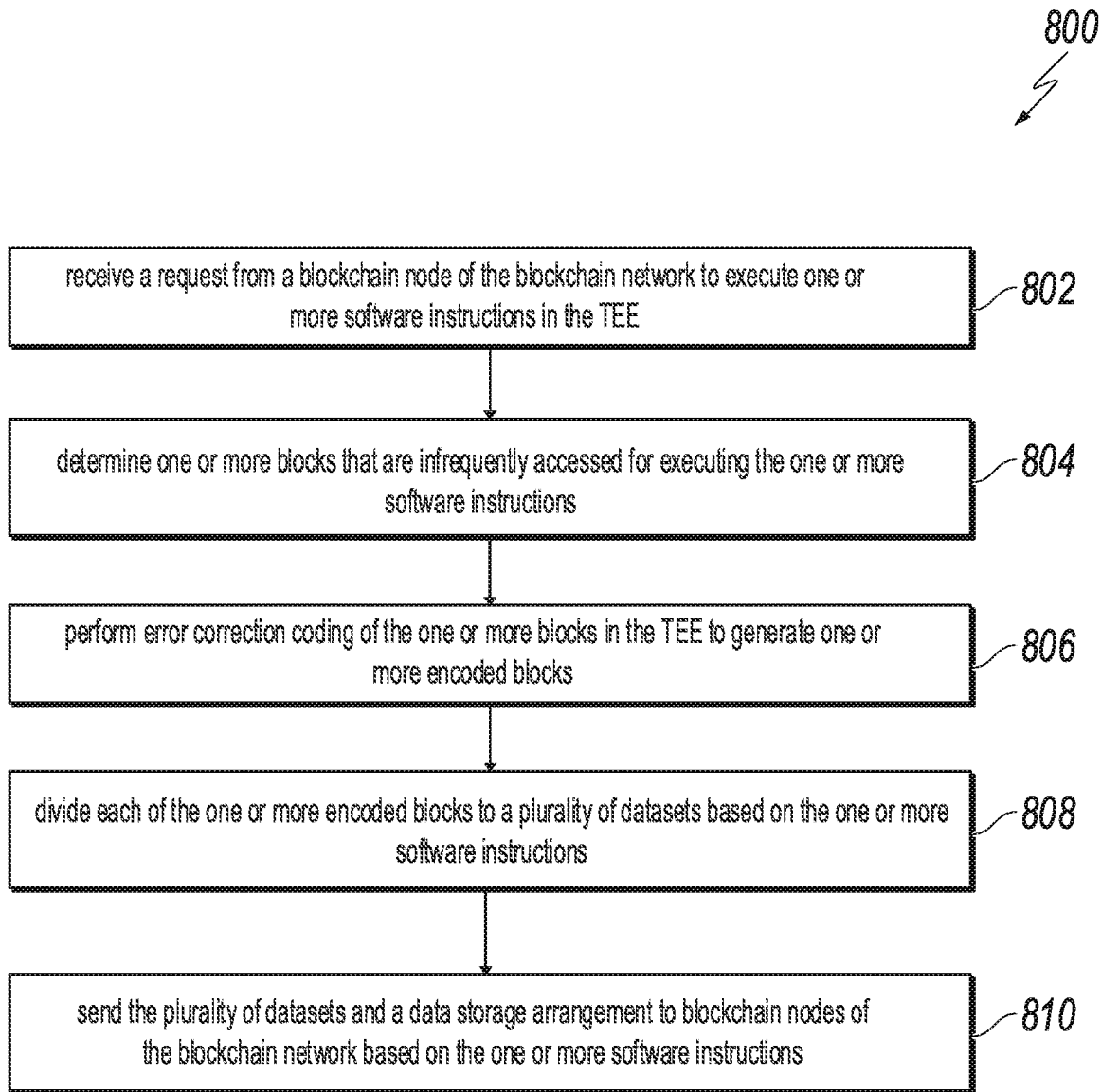
FIG. 8 depicts an example of a process that can be executed in accordance with embodiments of this specification.

FIG. 8 depicts an example of a process 800 that can be executed in accordance with embodiments of this specification. For convenience, the process 800 will be described as being performed by a system of one or more computers, located in one or more locations, and programmed appropriately in accordance with this specification. For example, a computing device in a computing system, e.g., the computing system 106, 108 of FIG. 1, appropriately programmed, can perform the process 800.

At 802, a computing device receives a request from a blockchain node of the blockchain network to execute one or more software instructions in the TEE.

At 804, the computing device determines one or more blocks that are infrequently accessed for executing the one or more software instructions, wherein the one or more blocks are stored on the blockchain node and are appended to a blockchain.

At 806, the computing device performs error correction coding of the one or more blocks in the TEE to generate one or more encoded blocks.

At 808, the computing device divides each of the one or more encoded blocks to a plurality of datasets based on the one or more software instructions.

At 810, the computing device sends the plurality of datasets and a data storage arrangement to blockchain nodes of the blockchain network based on the one or more software instructions, wherein the data storage arrangement indicates at least one of the plurality of datasets to be stored by each of the blockchain nodes.

In some examples, the one or more blocks are determined as infrequently accessed if the one or more blocks are created for a predetermined amount of time or no block data associated with the one or more blocks are retrieved to execute a smart contract for a predetermined amount of time.

In some examples, the error correction coding is performed in response to determining that a utilization rate of computational resource of the computing device is less than or equal to a predetermined value or usage of storage space of the computing device is greater than or equal to a predetermined percentage.

In some examples, the error correction coding is performed by adding redundant bits to the one or more blocks.

In some examples, the error correction coding is erasure coding.

In some examples, the data storage arrangement further indicates storing hashed values of a remainder of the plurality of datasets.

In some examples, the process 800 further comprising: deleting the one or more blocks stored on the blockchain node after the hash values of the remainder of the plurality of datasets are stored.

In some examples, the process 800 further comprising: indexing each of the plurality of datasets with a block ID of a corresponding block of the one or more blocks.

In some examples, the request includes one or more input parameters and is received through an application programming interface associated with the TEE.

Figure 9:
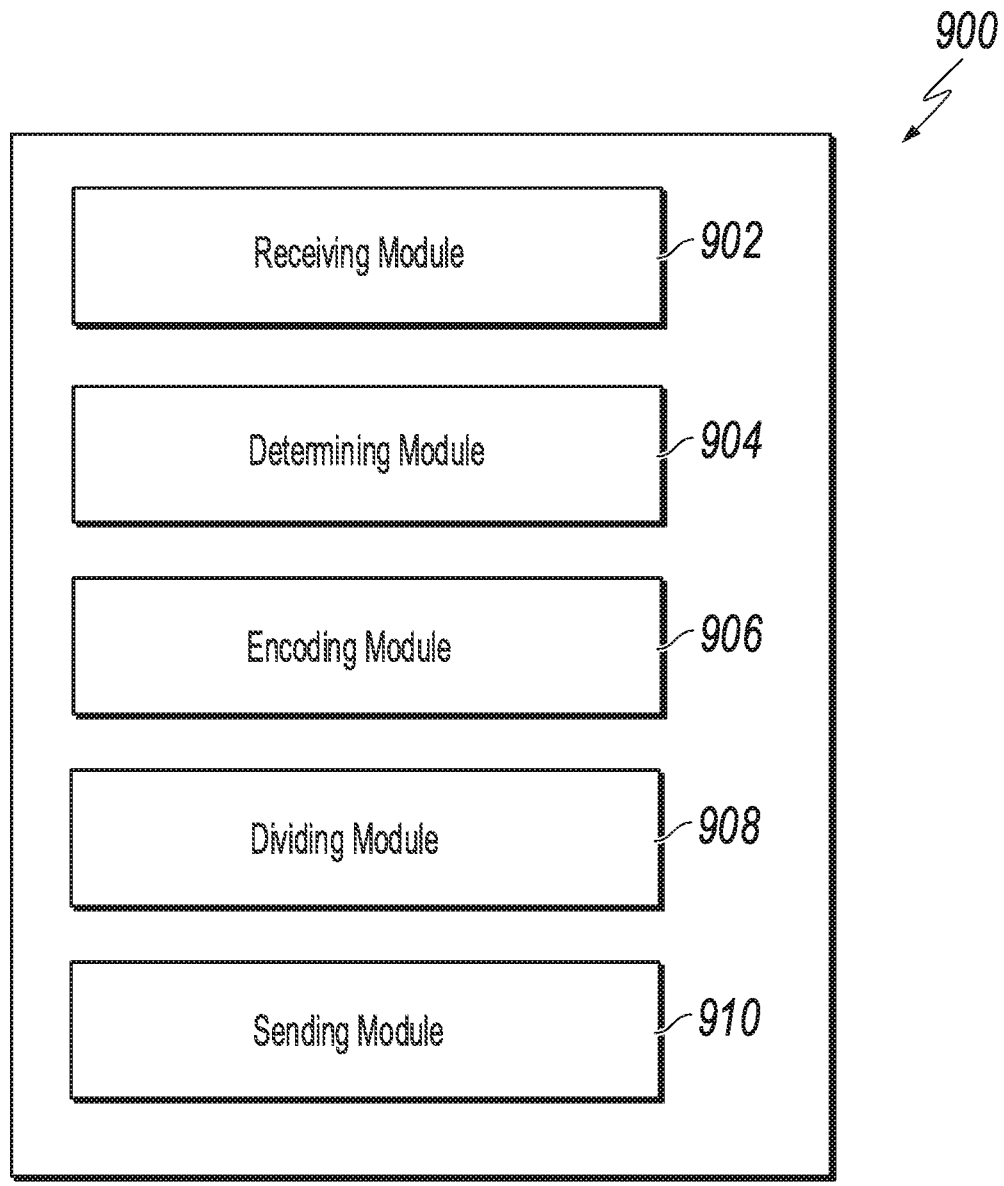
FIG. 9 depicts examples of modules of an apparatus in accordance with embodiments of this specification.

FIG. 9 depicts examples of modules of an apparatus 900 in accordance with embodiments of this specification. The apparatus 900 can be an example of an embodiment of a blockchain node configured to communicate and share blockchain data. The apparatus 900 can correspond to the embodiments described above, and the apparatus 900 includes the following: a receiving module 902 that receives a request from a blockchain node of the blockchain network to execute one or more software instructions in the TEE; a determining module 904 that determines one or more blocks that are infrequently accessed for executing the one or more software instructions, wherein the one or more blocks are stored on the blockchain node and are appended to a blockchain; an encoding module 906 that performs error correction coding of the one or more blocks in the TEE to generate one or more encoded blocks; a dividing module 908 that divides each of the one or more encoded blocks to a plurality of datasets based on the one or more software instructions; and a sending module 910 that sends the plurality of datasets and a data storage arrangement to blockchain nodes of the blockchain network based on the one or more software instructions, wherein the data storage arrangement indicates at least one of the plurality of datasets to be stored by each of the blockchain nodes.

In an optional embodiment, the one or more blocks are determined as infrequently accessed if the one or more blocks are created for a predetermined amount of time or no block data associated with the one or more blocks are retrieved to execute a smart contract for a predetermined amount of time.

In an optional embodiment, the error correction coding is performed in response to determining that a utilization rate of computational resource of the computing device is less than or equal to a predetermined value or usage of storage space of the computing device is greater than or equal to a predetermined percentage.

In an optional embodiment, the error correction coding is performed by adding redundant bits to the one or more blocks.

In an optional embodiment, the error correction coding is erasure coding.

In an optional embodiment, the data storage arrangement further indicates storing hashed values of a remainder of the plurality of datasets.

In an optional embodiment, the apparatus 900 further comprises: deleting the one or more blocks stored on the blockchain node after the hash values of the remainder of the plurality of datasets are stored.

In an optional embodiment, the apparatus 900 further comprises: indexing each of the plurality of datasets with a block ID of a corresponding block of the one or more blocks.

In an optional embodiment, the request includes one or more input parameters and is received through an application programming interface associated with the TEE.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 9, it can be interpreted as illustrating an internal functional module and a structure of a blockchain node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures as described in this specification.

The techniques described in this specification produce several technical effects. For example, embodiments of the subject matter reduce the burden on storage resources of blockchain nodes, while maintaining computational efficiency and data equality of the blockchain nodes. Because some blocks are infrequently accessed (e.g., older blocks), storage resources of blockchain nodes are conserved by saving only a portion of ECC encoded block (or simply, encoded block) on each blockchain node and sharing the remainder of the data with other blockchain nodes.

In some embodiments, a blockchain node can store a selected subset of the ECC encoded blocks and hash values corresponding to other subsets of the encoded blocks. To retrieve unsaved subsets of the encoded blocks from other blockchain nodes, the blockchain node can send corresponding hash values to the other blockchain nodes. Since hash values are irreversible, the blockchain node can verify whether the received data are authentic, by hashing the received data and comparing the hashed values with hash values that are locally stored. As such, data security can be ensured and faulty nodes can be identified. Even if the blockchain node receives unauthentic data from faulty blockchain nodes, the corresponding block can be recovered as long as the percentage of the unauthentic data is less than or equal to the maximum fraction of erroneous bits allowed by the ECC.

In some embodiments, instead of performing ECC on each blockchain node, the ECC can be performed in a TEE associated with a trusted node. By using TEE technology, the trusted node can generate verifiable encoded blocks, divide the encoded blocks to datasets, and send the datasets and a data storage arrangement to each blockchain node for storage. The datasets generated under TEE can be verifiable by the blockchain nodes to ensure data authenticity. Each blockchain node can then store a portion of the datasets based on the data storage arrangement to save on storage space. By having a TEE enabled trusted node, the ECC needs to be performed only once, instead of separately performed by each blockchain node. As such, the overall computing resource consumption of the blockchain network can be significantly reduced.

In some embodiments, each of the blockchain nodes can have a TEE to perform the ECC. Each blockchain node can separately request a corresponding TEE to perform ECC when computational resource consumption is low or usage rate of storage is high. The blockchain nodes can also synchronize with each other and request encoded blocks from TEEs associated with other blockchain nodes. As such, the usage of computational and storage resources of the blockchain network can be further optimized.

Described embodiments of the subject matter can include one or more features, alone or in combination. For example, in a first embodiment, a computer-implemented method for communicating shared blockchain data, the method comprising: receiving a request from a blockchain node of the blockchain network to execute one or more software instructions in the TEE; determining one or more blocks that are infrequently accessed for executing the one or more software instructions, wherein the one or more blocks are stored on the blockchain node and are appended to a blockchain; performing error correction coding of the one or more blocks in the TEE to generate one or more encoded blocks; dividing each of the one or more encoded blocks to a plurality of datasets based on the one or more software instructions; and sending the plurality of datasets and a data storage arrangement to blockchain nodes of the blockchain network based on the one or more software instructions, wherein the data storage arrangement indicates at least one of the plurality of datasets to be stored by each of the blockchain nodes.

The foregoing and other described embodiments can each, optionally, include one or more of the following features:

A first feature, combinable with any of the following features, the one or more blocks are determined as infrequently accessed if the one or more blocks are created for a predetermined amount of time or no block data associated with the one or more blocks are retrieved to execute a smart contract for a predetermined amount of time.

A second feature, combinable with any of the following features, the error correction coding is performed in response to determining that a utilization rate of computational resource of the computing device is less than or equal to a predetermined value or usage of storage space of the computing device is greater than or equal to a predetermined percentage.

A third feature, combinable with any of the following features, the error correction coding is performed by adding redundant bits to the one or more blocks.

A fourth feature, combinable with any of the following features, the error correction coding is erasure coding.

A fifth feature, combinable with any of the following features, the data storage arrangement further indicates storing hashed values of a remainder of the plurality of datasets.

A sixth feature, combinable with any of the following features, further comprising: deleting the one or more blocks stored on the blockchain node after the hash values of the remainder of the plurality of datasets are stored.

A seventh feature, combinable with any of the following features, further comprising: indexing each of the plurality of datasets with a block ID of a corresponding block of the one or more blocks.

An eighth feature, combinable with any of the following features, the request includes one or more input parameters and is received through an application programming interface associated with the TEE.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some examples be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some examples, multitasking and parallel processing may be advantageous.

What is claimed is:

1. A computer-implemented method for processing blockchain data in a trusted execution environment (TEE) executing on a computing device communicably coupled to a blockchain network, the computer-implemented method comprising:
    receiving a request from a blockchain node of the blockchain network to execute one or more software instructions in the TEE;
    determining one or more blocks that are infrequently accessed for executing the one or more software instructions, wherein the one or more blocks are stored on the blockchain node and are appended to a blockchain;
    performing error correction coding of the one or more blocks in the TEE to generate one or more encoded blocks;
    dividing each of the one or more encoded blocks into a plurality of datasets based on the one or more software instructions, wherein each dataset of the plurality of datasets is stored on a separate blockchain node of blockchain nodes of the blockchain network; and
    sending the plurality of datasets and a data storage arrangement to the blockchain nodes based on the one or more software instructions, wherein the data storage arrangement indicates at least one of the plurality of datasets to be stored by each of the blockchain nodes.

2. The computer-implemented method of claim 1, wherein the one or more blocks are determined as infrequently accessed if the one or more blocks are created for a predetermined amount of time or no block data associated with the one or more blocks are retrieved to execute a smart contract for a predetermined amount of time, wherein the predetermined amount of time is at least an average time in which a block of the one or more blocks is created.

3. The computer-implemented method of claim 1, wherein the error correction coding is performed in response to determining that a utilization rate of computational resource of the computing device is less than or equal to a predetermined value or usage of storage space of the computing device is greater than or equal to a predetermined percentage.

4. The computer-implemented method of claim 1, wherein the error correction coding is performed by adding redundant bits to the one or more blocks.

5. The computer-implemented method of claim 1, wherein the error correction coding is erasure coding.

6. The computer-implemented method of claim 1, wherein the sending of the plurality of datasets and the data storage arrangement to the blockchain nodes comprises:
    transmitting, to each blockchain node of the blockchain nodes, a particular dataset among the plurality of datasets that corresponds to the blockchain node and hashed values of other datasets among the plurality of datasets.

7. The computer-implemented method of claim 6, further comprising:
    deleting the one or more blocks stored on the blockchain node after the hashed values of the other datasets are stored.

8. The computer-implemented method of claim 6, further comprising:
    indexing each of the plurality of datasets with a block ID of a corresponding block of the one or more blocks, the block ID being used by the blockchain node to map the hashed values to the one or more blocks.

9. The computer-implemented method of claim 1, wherein the request includes one or more input parameters and is received through an application programming interface associated with the TEE.

10. A non-transitory, computer-readable medium storing one or more instructions executable by a computer system to perform operations for processing blockchain data in a trusted execution environment (TEE) executing on a computing device communicably coupled to a blockchain network, comprising:
   receiving a request from a blockchain node of the blockchain network to execute one or more software instructions in the TEE;
   determining one or more blocks that are infrequently accessed for executing the one or more software instructions, wherein the one or more blocks are stored on the blockchain node and are appended to a blockchain;
   performing error correction coding of the one or more blocks in the TEE to generate one or more encoded blocks;
   dividing each of the one or more encoded blocks into a plurality of datasets based on the one or more software instructions, wherein each dataset of the plurality of datasets is stored on a separate blockchain node of blockchain nodes of the blockchain network; and
   sending the plurality of datasets and a data storage arrangement to the blockchain nodes based on the one or more software instructions, wherein the data storage arrangement indicates at least one of the plurality of datasets to be stored by each of the blockchain nodes.

11. The non-transitory, computer-readable medium of claim 10,
   wherein the one or more blocks are determined as infrequently accessed if no block data associated with the one or more blocks are retrieved to execute a smart contract for a predetermined amount of time, wherein the predetermined amount of time is at least an average time a block of the one or more blocks is created.

12. The non-transitory, computer-readable medium of claim 10, wherein the error correction coding is performed in response to determining that a utilization rate of computational resource of the computing device is less than or equal to a predetermined value or usage of storage space of the computing device is greater than or equal to a predetermined percentage.

13. The non-transitory, computer-readable medium of claim 10, wherein the error correction coding is performed by adding redundant bits to the one or more blocks.

14. The non-transitory, computer-readable medium of claim 10, wherein the error correction coding is erasure coding.

15. The non-transitory, computer-readable medium of claim 10, wherein the data storage arrangement further indicates storing hashed values of a remainder of the plurality of datasets.

16. The non-transitory, computer-readable medium of claim 15, further comprising:
   deleting the one or more blocks stored on the blockchain node after the hashed values of the remainder of the plurality of datasets are stored.

17. The non-transitory, computer-readable medium of claim 10, further comprising:
   indexing each of the plurality of datasets with a block ID of a corresponding block of the one or more blocks.

18. The non-transitory, computer-readable medium of claim 10, wherein the request includes one or more input parameters and is received through an application programming interface associated with the TEE.

19. A computer-implemented system for processing blockchain data in a trusted execution environment (TEE) executing on a computing device communicably coupled to a blockchain network, comprising:
   one or more processors; and
   one or more computer-readable memories coupled to the one or more processors and having instructions stored thereon that are executable by the one or more processors to perform one or more operations for:
      receiving a request from a blockchain node of the blockchain network to execute one or more software instructions in the TEE;
      determining one or more blocks that are infrequently accessed for executing the one or more software instructions, wherein the one or more blocks are stored on the blockchain node and are appended to a blockchain;
      performing error correction coding of the one or more blocks in the TEE to generate one or more encoded blocks;
      dividing each of the one or more encoded blocks into a plurality of datasets based on the one or more software instructions, wherein each dataset of the plurality of datasets is stored on a separate blockchain node of blockchain nodes of the blockchain network; and
      sending the plurality of datasets and a data storage arrangement to the blockchain nodes based on the one or more software instructions, wherein the data storage arrangement indicates at least one of the plurality of datasets to be stored by each of the blockchain nodes.

20. The computer-implemented system of claim 19, wherein the one or more blocks are determined as infrequently accessed if no block data associated with the one or more blocks are retrieved to execute a smart contract for a predetermined amount of time, wherein the predetermined amount of time is twice an average time a block of the one or more blocks is created.

21. The computer-implemented system of claim 19, wherein the error correction coding is performed in response to determining that a utilization rate of computational resource of the computing device is less than or equal to a predetermined value or usage of storage space of the computing device is greater than or equal to a predetermined percentage.

22. The computer-implemented system of claim 19, wherein the error correction coding is performed by adding redundant bits to the one or more blocks.

23. The computer-implemented system of claim 19, wherein the error correction coding is erasure coding.

24. The computer-implemented system of claim 19, wherein the data storage arrangement further indicates storing hashed values of a remainder of the plurality of datasets.

25. The computer-implemented system of claim 24, further comprising:
   deleting the one or more blocks stored on the blockchain node after the hashed values of the remainder of the plurality of datasets are stored.

26. The computer-implemented system of claim 19, further comprising:
   indexing each of the plurality of datasets with a block ID of a corresponding block of the one or more blocks.

27. The computer-implemented system of claim 19, wherein the request includes one or more input parameters and is received through an application programming interface associated with the TEE.

\* \* \* \* \*